(12) United States Patent
Choi et al.

(10) Patent No.: US 6,393,397 B1
(45) Date of Patent: May 21, 2002

(54) COHORT MODEL SELECTION APPARATUS AND METHOD

(75) Inventors: Ho Chuen Choi, Dundas; Xiaoyuan Zhu, Canterbury; Jianming Song, Kingsgrove, all of (AU)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/332,927

(22) Filed: Jun. 14, 1999

(30) Foreign Application Priority Data

Jun. 17, 1998 (AU) .......................................... 71901/98

(51) Int. Cl.$^7$ .............................................. G10L 15/06
(52) U.S. Cl. ......................... 704/250; 704/238; 704/239
(58) Field of Search ................................ 704/247, 246, 704/239, 240, 231, 250, 252, 255, 256, 238

(56) References Cited

U.S. PATENT DOCUMENTS

| | | | |
|---|---|---|---|
| 5,339,385 A | | 8/1994 | Higgins |
| 5,675,704 A | * | 10/1997 | Juang et al. ................ 704/246 |
| 5,687,287 A | * | 11/1997 | Gandhi et al. ............. 395/2.56 |
| 6,006,184 A | * | 12/1999 | Yamada et al. ............. 704/246 |
| 6,081,660 A | * | 6/2000 | Macleod et al. ....... 395/500.23 |
| 6,107,935 A | * | 8/2000 | Comerford et al. .... 340/825.31 |
| 6,182,037 B1 | * | 1/2001 | Maes .......................... 704/247 |
| 6,205,424 B1 | * | 3/2001 | Goldenthal et al. ......... 704/247 |
| 6,253,179 B1 | * | 6/2001 | Beigi et al. .................. 704/243 |

OTHER PUBLICATIONS

"Speaker Verification using Normalized Log–likelihood Score" by Chi–Shi Liu, Hsiao–Chuan Wang & Chin–Hui Lee published in IEEE Transactions on Speech and Audio Processing, vol. 4, No. 1 Jan. 1996.

"Speaker Identification and Verification using Gaussian Mixture Speaker Models" by Douglas A. Reynolds published in ESCA Workshop on Automatic Speaker Recognition, Identification and Verification in Apr. 1994 and, later, Speech Communication 17 (2995) 91–108 published by Elsevier Science B.V.

"Text–independent Speaker Recognition using VQ, Mixture Gaussian VQ and Ergodic HMMs" by Xiaoyuan Zhu, Yuqing Gao, Shuping Ran, Fangxin Chen, Iain Macleod, Bruce Miller & Michael Wagner published in ESCA Workshop on Automatic Speaker Recognition, Identification and Verification in Apr. 1994.

"Similarity Normalization Method for Speaker Verification Based on a Posteriori Probability"by Tomoko Matsui & Sadaoka Furui published in ESCA Workshop on Automatic Speaker Recognition, Identification and Verification in Apr. 1994.

* cited by examiner

Primary Examiner—Richemond Dorvil
(74) Attorney, Agent, or Firm—Daniel K. Nichols

(57) ABSTRACT

An apparatus for selecting a cohort model for use in a speaker verification system includes a model generator (108) for determining a target speaker model (114) from a speech sample collected from the target speaker (106). A cohort selector (110) determines a similarity value between each of a number of predetermined existing speaker models from a model pool (112) and the target speaker model (114) and a dissimilarity value between each of the existing speaker models and any previously selected cohort models (116). An existing speaker model which is most similar to the target speaker model, but most dissimilar to previously chosen cohort models, is then chosen as another cohort model for the target speaker.

26 Claims, 3 Drawing Sheets

COHORT MODEL SELECTION APPARATUS AND METHOD

FIELD OF THE INVENTION

This invention relates to an apparatus and method for selecting one or more cohort models for use in a speaker verification system.

BACKGROUND OF THE INVENTION

In various circumstances it is desirable to be able to limit access to a particular location or function to only one or more authorised individuals. Often an identifying badge or Personal Identification Number (PIN) are utilised for such purposes. Increasingly, efforts have been made to supplement such traditional identifiers with one or more biometric indicators. Finger-prints, retinal patterns, hand shape, and voice have, for example, all been considered in this regard, as all of these criteria are relatively unique to each individual.

In speaker verification systems, the individual person typically speaks a predetermined statement or series of sounds. These sounds are then compared in some way against a previously stored sample of that same person's speech pattern. A sufficiently close match yields a positive verification that the speaker is who he or she claims to be, otherwise there is no such verification.

In one prior art approach, such speaker verification is accomplished by comparing this person's present voice input against both a previously stored model representing that person's speech, and also against one or more so-called cohort models. The cohort models are typically selected from many (typically hundreds) previously stored speech models of other individuals, in order to locate a sub-set of relatively close models by comparing an original speech utterance of the person with the previously stored speech models. The previously stored speech models that are most similar to the original speech utterance are then used as the cohort models, each of which is close, but not equal, to the target individual's actual speech pattern. Upon comparing a claimed person's present speech utterance against both the previously stored model and the cohort models, a determination can be made as to whether the present utterance is more similar to the stored model or to a cohort model. If more similar to a cohort model, a rejection is returned. If, however, the present utterance is closer to the original model, an acceptance can be returned.

Using prior art techniques, determining which of the previously stored speech models are most similar to the original speech utterance involves, in effect, running the original speech utterance through each of the stored speech models to determine the most similar, which is a computationally intensive and time consuming process. When first installing such a facility in an existing location having numerous employees, the training activity, including a significant amount of time spent determining the cohort models, can, at best, inconvenience the individual, and at worst, significantly delay clearance and participation for a significant number of individuals.

The cohort model approach to speaker verification, however, continues to offer significant promise with respect to both subsequent robustness, accuracy, and ease of use. A need therefore exists for a way to support cohort model based speaker verification systems while still reducing the amount of time required to select the cohort models for each new person.

In this specification, including the claims, the terms "comprises", "comprising" or similar terms are intended to mean a non-exclusive inclusion, such that a method or apparatus that comprises a list of elements does not include those elements solely, but may well include other elements not listed.

BRIEF SUMMARY OF THE INVENTION

The present invention therefore seeks to provide a method of and system for selecting a cohort model for use in a speaker verification system which overcomes, or at least reduces the above-mentioned problems of the prior art.

Accordingly, in one aspect, the invention provides a method of selecting at least one cohort model for use in a speaker verification system, the method including the steps of: providing a group of existing speaker models; receiving target speaker voice utterances from a target speaker; digitizing at least portions of the received utterances to provide at least one speech sample; determining a target speaker model from the at least one speech sample; determining at least one similarity value between each of a plurality of the existing speaker models and the target speaker model; and utilising the at least one similarity value to select at least one similar existing speaker model as a cohort model for the target speaker.

In one preferred embodiment, the method of selecting a cohort model further includes the steps of: determining at least one dissimilarity value between at least some of the plurality of the existing speaker models and each cohort model previously selected; and selecting at least one of the existing speaker models which is similar to the target speaker model and dissimilar to the at least one cohort model previously selected as at least one cohort model for the target speaker.

Preferably, each speaker model and cohort model comprises a set of parameters, each parameter representing a characteristic of the speech of the speaker, and the step of determining at least one similarity value between an existing speaker model and the target speaker model comprises the step of comparing the value of at least one of the parameters of the existing speaker model with the value of at least one corresponding parameter of the target speaker model to determine the similarity value.

In one embodiment, the step of determining the dissimilarity value comprises the step of: comparing the value of at least one of the parameters of the existing speaker model with the value of at least one corresponding parameter of the cohort model to determine the dissimilarity value. Preferably, the step of selecting at least one of the existing speaker models which is similar to the target speaker model but dissimilar to the at least one previously selected cohort model involves combining in a predetermined combination the dissimilarity values of two or more previously selected cohort models and selecting at least one of the existing speaker models which has a high similarity value and a high combined dissimilarity value. Conveniently, the predetermined combination can be normalised to the similarity values. One of the parameters is preferably a vector, which can be quantised, representing the frequency response of a time sample of the utterance.

Preferably, each parameter of the set of parameters is represented by a vector and the step of determining at least one similarity value between an existing speaker model and the target speaker model includes the steps of: determining at least two vectors for each existing speaker model and for the target speaker model; for each existing speaker model vector, determining the distance in the n-dimensional space between that existing speaker model vector and each target speaker model vector and, for each existing speaker model vector, storing whichever distance has a minimum value; and summing the stored minimum distances to provide the at least one similarity value.

Preferably, the step of determining at least one dissimilarity value between an existing speaker model and a cohort model includes the steps of: determining at least two vectors for each existing speaker model and for the cohort model; for each existing speaker model vector, determining the distance in the n-dimensional space between that existing speaker model vector and each cohort model vector and, for each existing speaker model vector, storing whichever distance has a minimum value; and summing the stored minimum distances to provide the at least one dissimilarity value.

According to a second aspect, the invention provides an apparatus for selecting at least one cohort model for use in a speaker verification system, the apparatus including: a database of existing speaker models; a receiver for receiving target speaker voice utterances from a target speaker; a speech digitizer coupled to the receiver to provide at least one speech sample; a modeller coupled to the speech digitizer for producing and storing a target speaker model from the at least one speech sample; similarity determining means coupled to the database and the modeller for determining at least one similarity value between each of a plurality of the existing speaker models and the target speaker model; storage means coupled to the similarity determining means for storing the similarity values; selection means coupled to the storage means for comparing the similarity values and selecting at least one similar existing speaker model as a cohort model for the target speaker; and a memory coupled to the selection means for storing the cohort model.

In a preferred embodiment, the apparatus further includes dissimilarity determining means coupled to the database and the memory for determining at least one dissimilarity value between at least some of the plurality of the existing speaker models and each cohort model previously selected; wherein the selection means is coupled to the dissimilarity determining means for selecting at least one of the existing speaker models which is similar to the target speaker model and dissimilar to the at least one cohort model previously selected as at least another one cohort model for the target speaker.

Preferably, each speaker model and cohort model comprises a set of parameters, each parameter representing a characteristic of the speech of the speaker, and the similarity determining means comprises a comparator circuit for comparing the value of at least one of the parameters of the existing speaker model with the value of at least one corresponding parameter of the target speaker model to determine the similarity value. The comparator circuit preferably comprises means for storing at least two vectors representing at least two of the parameters in n-dimensional space for each existing speaker model and the target speaker model, means for determining the distance in the n-dimensional space, for each existing speaker model vector, between that existing speaker model vector and each target speaker model vector, means for storing, for each existing speaker model vector, whichever distance to a target speaker model vector has a minimum value, and means for summing the stored minimum distances to provide the at least one similarity value.

The dissimilarity determining means preferably includes a comparator circuit for comparing the value of at least one of the parameters of the existing speaker model with the value of at least one corresponding parameter of the cohort model to determine the dissimilarity value. The comparator circuit preferably comprises means for storing at least two vectors representing at least two of the parameters in n-dimensional space for each existing speaker model and each previously selected cohort model, means for determining the distance in the n-dimensional space, for each existing speaker model vector, between that existing speaker model vector and each cohort model vector, means for storing, for each existing speaker model vector, whichever distance to a cohort model vector has a minimum value, and means for summing the stored minimum distances to provide the at least one dissimilarity value.

In one preferred embodiment, the selection means includes combining means for combining in a predetermined combination the dissimilarity values of two or more previously selected cohort models and the selection means selects at least one of the existing speaker models which has a high similarity value and a high combined dissimilarity value.

Preferably, the combining means includes a normaliser for normalising the predetermined combination to the similarity values.

BRIEF DESCRIPTION OF THE DRAWINGS

One embodiment of the invention will now be more fully described, by way of example, with reference to the drawings, of which.

DETAILED DESCRIPTION OF THE DRAWINGS

Thus, a preferred embodiment of the present invention concerns a method and apparatus for choosing a set of cohort models efficiently during a registration stage of registering a new user onto a system which can then verify that person at a later date to improve accuracy and robustness of the speaker verification system.

Figure 1:
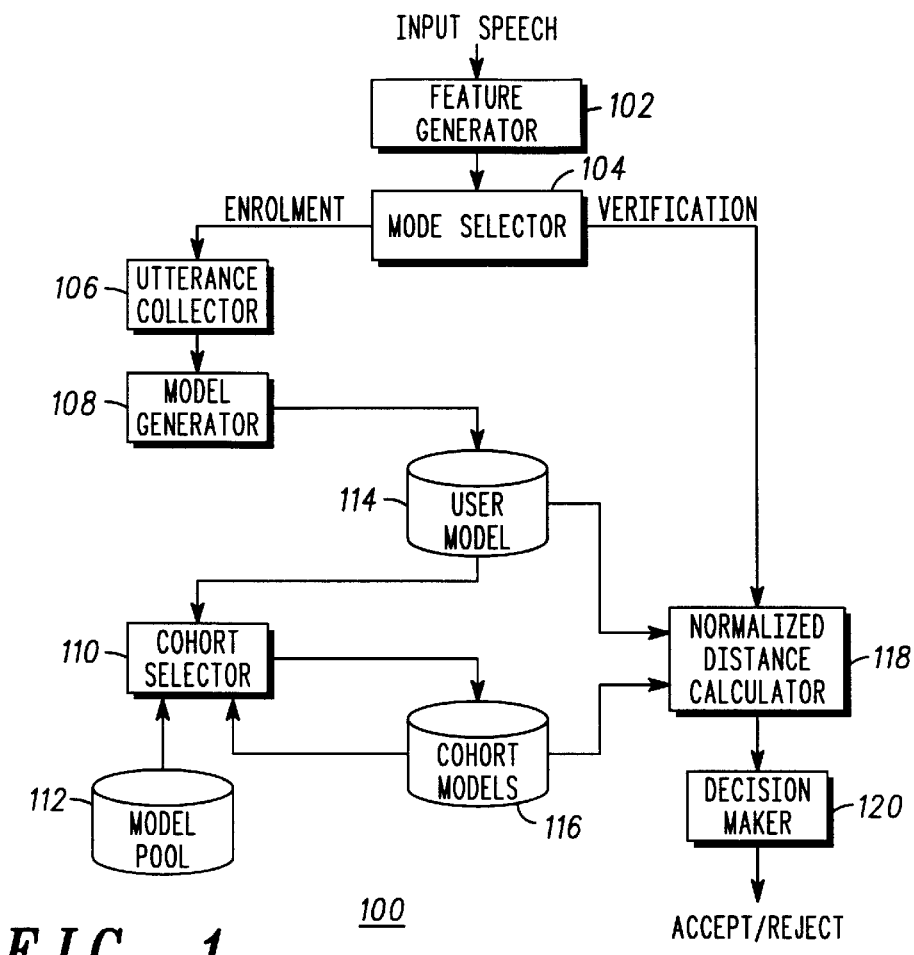
FIG. 1 shows a schematic block diagram of a speaker verification system incorporating an embodiment according to the invention of a method and apparatus for choosing a set of cohort models for the system.

FIG. 1 shows a general block diagram of a speaker verification system 100 which utilizes the cohort selection method according to this embodiment of the present invention. An acoustic input speech signal from a person to be registered is first applied to a feature generator 102 which converts the analog speech signal into a sequence of feature vectors known in the art as mel-frequency cepstral coefficients (MFCC). The operation of feature generator 102 will be described in more detail below.

When the speaker verification system 100 is in the registration stage, a mode selector 104 will direct the output feature vectors from feature generator 102 to an utterance collector 106. In the registration stage, these feature vectors corresponding to each utterance of a user are stored in the utterance collector 106 until a desired number of utterances have been collected. After the required number of utterances have been collected, this training set of feature vectors is passed to a model generator 108. From the collected feature vectors, model generator 108 generates a corresponding user model 114 based, for example, on the Linde-Buzo-Gray (LBG) algorithm, as described in "An Algorithm for Vector Quantizer design", IEEE Trans. Communications, Vol 28, pp. 84–95, January 1980, by Y. A. Linde et al. The use of the LBG algorithm is to find a set of code vectors or codewords into which all feature vectors in the training set can be quantized with minimum distortion. This collection of codewords forms a codebook for the feature space. In the present embodiment, the codebook size, i.e. number of codewords, is 128.

Once user model 114 is generated, it is passed to a cohort selector 110 to select the appropriate cohort set for the user. The user model 114 is also stored for later use in verification. A model pool 112 includes a number of models from a plurality of speakers, not necessarily being users of the system. Cohort selector 110 compares current user model 114 with each model in the model pool 112 and selects appropriate models to form the cohort set 116 for this user. The detailed operation of cohort selector 110 will be discussed later. After the cohort set 116 has been selected and stored, the whole enrolment is completed, and system 100 is ready for verifying the voice of this particular user.

In the verification stage, feature vectors from feature generator 102 are directed to a normalized distance calculator 118 through mode selector 104. Based on the claimed identity, the corresponding user model 114 and cohort set 116 are retrieved and also passed to the normalized distance calculator 118. The normalized distance calculator 118 then computes the resultant normalized distance, that is, a measure of how close the utterance is to the user mode, relative to the average distance between the utterance and the cohort set. This technique is described in an article entitled "An Overview of Speaker Recognition Technology" in Proc. ESCA Workshop on Automatic Speaker Recognition, Identification and Verification, pp. 1–9, April 1994, by S. Furui, where a representative method of computing the normalized distance is disclosed. The normalized distance thus calculated is then passed to decision maker 120 where the distance is compared with a pre-defined threshold. If the normalized distance is found to be less than the given threshold, the claimed identity is accepted by the system 100. Otherwise, the claimed identity is rejected.

Figure 2:
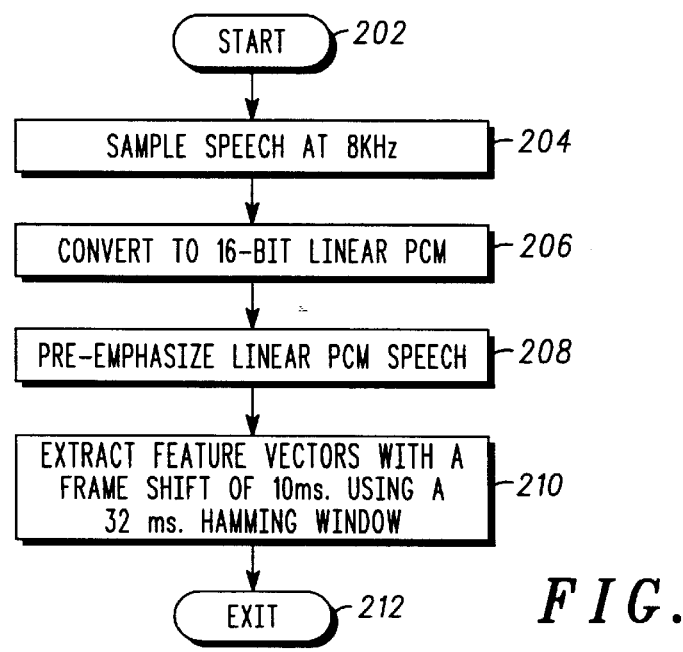
FIG. 2 shows a flow diagram of the main stages of the operation of the feature generator of FIG. 1.

The operation of feature generator 102 will now be described with reference to the flow diagram shown in FIG. 2. Starting at step 202, the feature generator 102 samples the incoming speech with an appropriate bandpass filter at a sampling frequency of 8 Khz, as shown in step 204. The sampled speech is then converted, in step 206, to 16-bit linear pulse code modulation (PCM) codes as known in the art for digital representation of speech. The PCM coded speech is then pre-emphasized, in step 208, with a digital filter to increase the relative energy of the high-frequency spectrum. A filter with a frequency response $H(z)=1-0.95z^{-1}$ is used in the preferred embodiment. Feature vectors are extracted from the pre-emphasized speech with a 10 ms frame shift and a 32 ms Hamming window in step 210. Typically a MFCC feature vector is used and a representative way of computing the coefficients can be found in "Cepstral Analysis Technique for Automatic Speaker Verification", IEEEE Trans. Acoustics, Speech and Signal Processing, Vol. 29, pp. 254–272, April 1981, by S. Furui. In the present embodiment, a feature vector consists of 12 MFCCs. When all the feature vectors have been extracted, the operation of feature generator 102 is completed and it exits at step 212 to mode selector 104.

Figure 3:
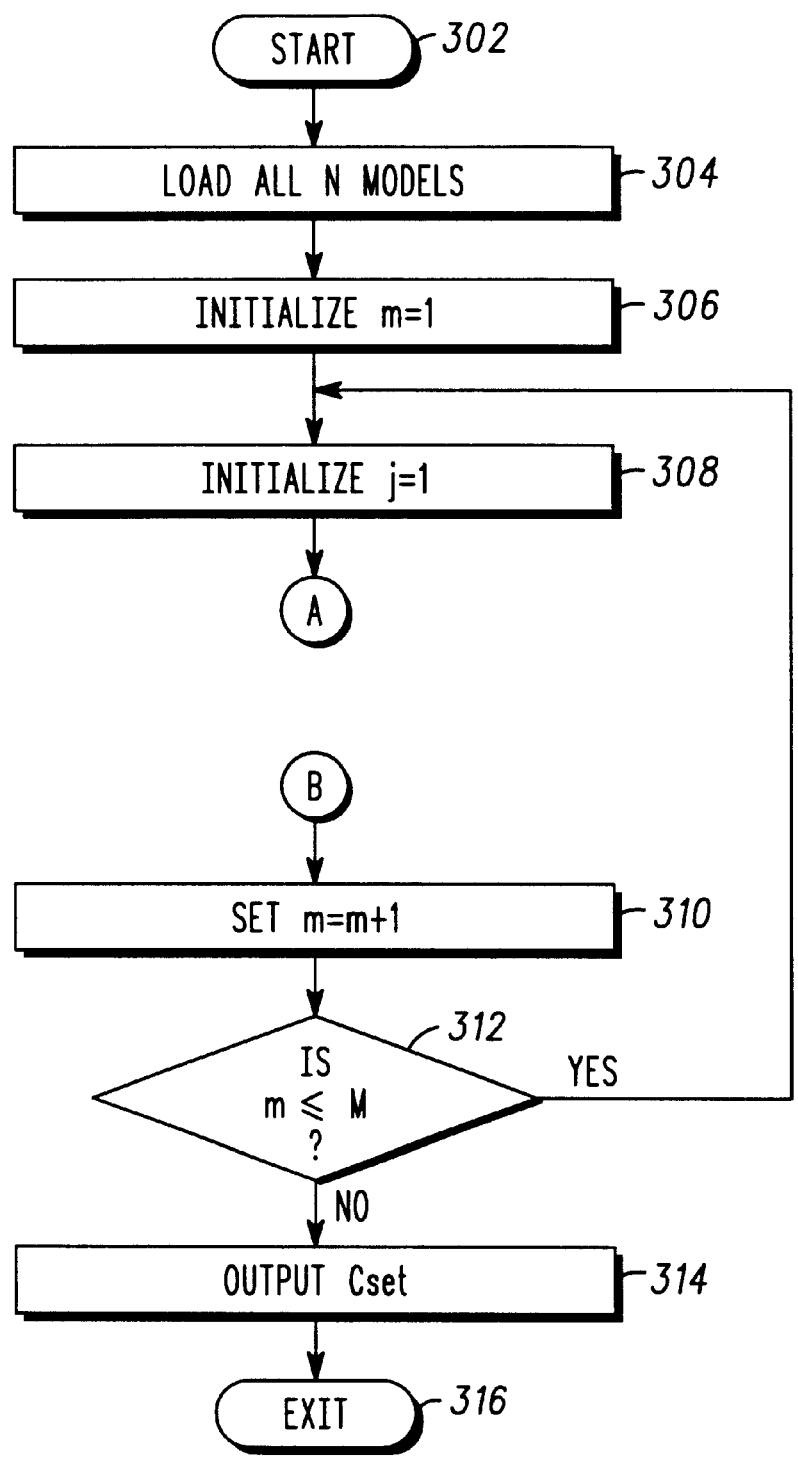
FIG. 3 shows a flow diagram of the main stages of the operation of the cohort selector of FIG. 1.
Figure 4:
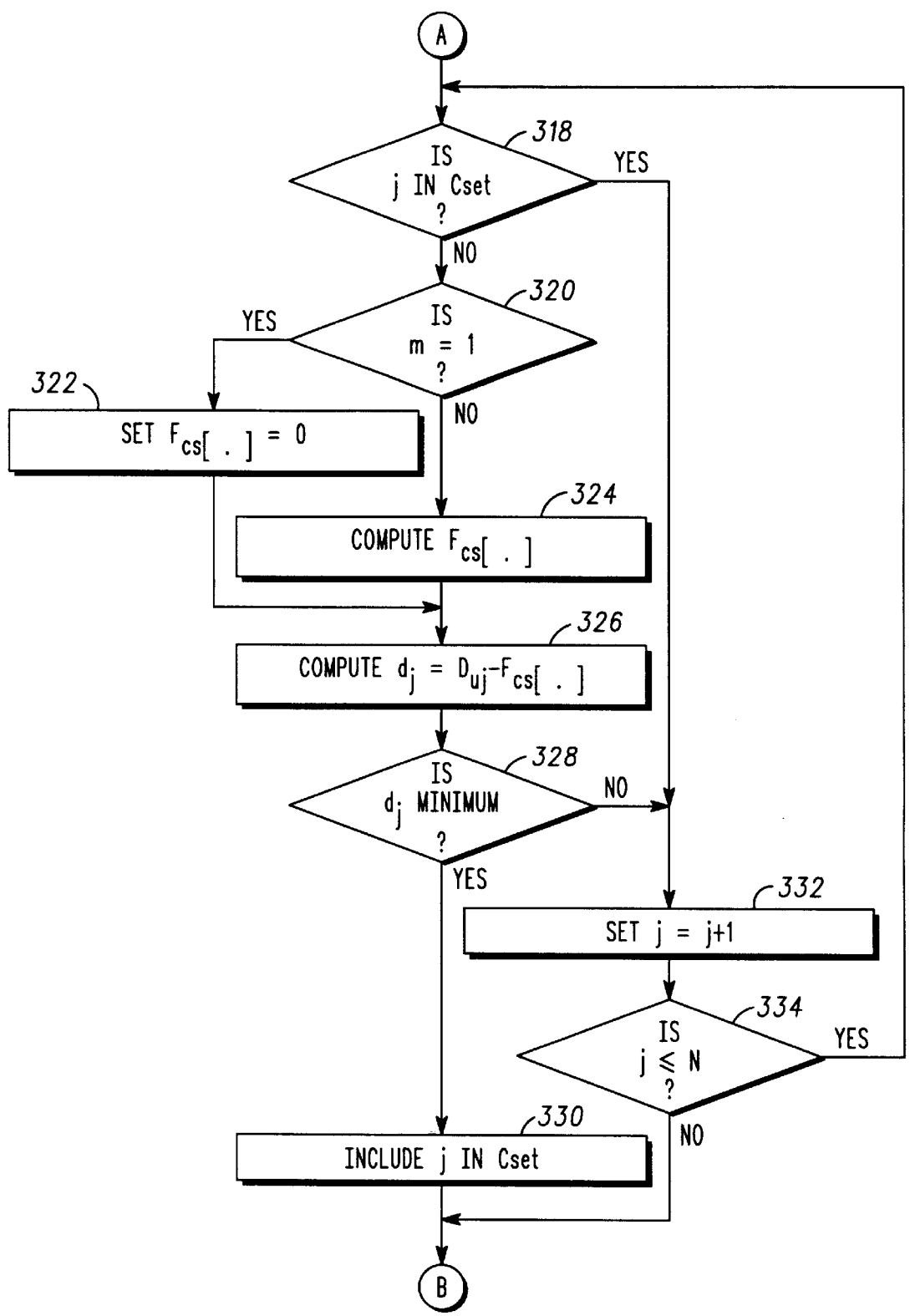
FIG. 4 shows a flow diagram of a part of the operation of FIG. 3.

Referring now to FIG. 3, the operation of cohort collector 110 which carries out the successive cohort selection (SCS) will be described. Starting at step 302, cohort selector 110 first loads Nmodels from model pool 112 in step 304. Then index m, representing the m-th cohort model to be selected, is initialized to 1 in step 306. Next, initialization of index j to1 takes place in step 308, where j denotes the j-th model in the model pool and $1 \leq j \leq N$. For the j-th model in the model pool, cohort selector 110 checks, in step 318, whether this model has already been included in the cohort set (denoted as Cset). If the j-th model has been included previously, index j is incremented by one in step 332. Otherwise, index m is checked whether it is equal to 1 in step 320.

If m is not equal to 1, the normalized distance between the j-th model and the existing cohort set is computed in step 324. In the preferred embodiment, this normalized distance is calculated using the function $F_{cs}[.]$ which is given by:

$$F_{cs}[D_{nj}] = \frac{1}{m-1} \sum_{n \in Cset} D_{nj} \quad (1)$$

where $D_{nj}$ is the distance between the j-th model and the n-th cohort model obtained so far and it is defined as:

$$D_{nj} = \sum_{k=1}^{N_{cb}} \min_l [dist(\mu_{nl}, \mu_{jk})] \quad (2)$$

where $N_{cb}$ is the codebook size (i.e. number of codewords), $\mu_{jk}$ is the k-th codeword of the j-th model, min[.] is a function which returns the minimum value of distances calculated across all the codewords in the n-th cohort model, and the function dist(.) is defined as:

$$dist(x, y) = \sqrt{\sum_{s=1}^{S} \frac{(x_s - y_s)^2}{\sigma_{xs}^2 + \sigma_{ys}^2}} \quad (3)$$

where $x_s$ and $y_s$ are the s-th components of the respective vectors x and y, $\sigma_{xs}^2$ and $\sigma_{us}^2$ are the variances of the s-th components of the respective feature vectors, and S is the feature vector size which is equal to 12. It should be noted that other statistical functions, such as maximum, minimum or median, can also be used in equation (1) for the calculation of the normalized distance between a model in the model pool and a set of cohort models.

On the other hand, if m is equal to 1, $F_{cs}[.]$ is simply set to zero in step 322. After $F_{cs}[.]$ has been calculated either in step 322 or step 324, the final relative distance $d_j$ for the j-th model is calculated in step 326 by using the equation:

$$i\ d_j = D_{uj} - F_{cs}[D_{nj}] \quad (4)$$

where $D_{uj}$ is the distance, as defined in equation (2), between the jth model and the user model. Thus, the distance $D_{nj}$ can be thought of as a measure of the similarity (or dissimilarity, since the negative value is being used) between the j-th model and the n-th cohort model and the distance $D_{uj}$ can be thought of as a measure of the similarity between the j-th model and the user model.

The value of $d_j$ is stored and checked to determine whether it is the minimum value across all the models inside the model pool in step 328. If $d_j$ is the minimum value, that j-th model is included in the cohort set as the m-th cohort model in step 330, and index m is then incremented by one in step 310. Otherwise if $d_j$ not a minimum value, index j is incremented by one in step 332. After the incrementing of index j, this index is checked whether its value is greater than N in step 334. If all the N models in the model pool have been processed, index m is incremented by one in step 310. Otherwise, if j≦N the calculation of relative distance is repeated for the next model in the model pool and the control branches back to step 318. After incrementation of index m, its value is checked in step 312 to determine whether it is less than or equal to M, which is the desired number of cohort models. If m is less than or equal to M, the control branches back to step 308 to determine the next cohort model. Otherwise, if m is greater than M, the required number of cohort models have been found and the cohort set is stored and output in step 314. This complete the whole SCS procedure and the system exits at step 316.

It will be appreciated that although only one particular embodiment of the invention has been described in detail, various modifications and improvements can be made by a person skilled in the art without departing from the scope of the present invention.

We claim:

1. A method of selecting at least one cohort model for use in a speaker verification system, the method comprising the steps of:

providing a group of existing speaker models;

receiving target speaker voice utterances from a target speaker;

digitizing at least portions of the received utterances to provide at least one speech sample;

determining a target speaker model from the at least one speech sample;

determining at least one similarity value between each of a plurality of the existing speaker models and the target speaker model; and utilising the at least one similarity value to select at least one similar existing speaker model as a cohort model for the target speaker.

2. A method of selecting a cohort model according to claim 1, further comprising the steps of:

determining at least one dissimilarity value between at least some of the plurality of the existing speaker models and each cohort model previously selected; and selecting at least one of the existing speaker models which is similar to the target speaker model and dissimilar to the at least one cohort model previously selected as at least one cohort model for the target speaker.

3. A method of selecting a cohort model according to claim 2, wherein the step of determining at least one dissimilarity value between at least some of the plurality of the existing speaker models and each cohort speaker model previously selected includes the step of, for each existing speaker model and cohort model for which a dissimilarity value is to be determined:

comparing the value of at least one of the parameters of the existing speaker model with the value of at least one corresponding parameter of the cohort model to determine the dissimilarity value.

4. A method of selecting a cohort model according to claim 3, wherein the step of selecting at least one of the existing speaker models which is similar to the target speaker model but dissimilar to the at least one previously selected cohort model involves combining in a predetermined combination the dissimilarity values of two or more previously selected cohort models and selecting at least one of the existing speaker models which has a high similarity value and a high combined dissimilarity value.

5. A method of selecting a cohort model according to claim 4, wherein the predetermined combination is normalised to the similarity values.

6. A method of selecting a cohort model according to claim 4, wherein the predetermined combination is an average.

7. A method of selecting a cohort model according to claim 3, wherein at least one of the parameters is a vector.

8. A method of selecting a cohort model according to claim 7, wherein the vector is a representation of the at least one parameter in n-dimensional space.

9. A method of selecting a cohort model according to claim 8, wherein each parameter of the set of parameters is represented by a vector and the step of determining at least one similarity value between an existing speaker model and the target speaker model includes the steps of:

determining at least two vectors for each existing speaker model and for the target speaker model;

for each existing speaker model vector, determining the distance in the n-dimensional space between that existing speaker model vector and each target speaker model vector and, for each existing speaker model vector, storing whichever distance has a minimum value; and summing the stored minimum distances to provide the at least one similarity value.

10. A method of selecting a cohort model according to claim 9, wherein the step of determining at least one dissimilarity value between an existing speaker model and a cohort model includes the steps of:

determining at least two vectors for each existing speaker model and for the cohort model;

for each existing speaker model vector, determining the distance in the n-dimensional space between that existing speaker model vector and each cohort model vector and, for each existing speaker model vector, storing whichever distance has a minimum value; and summing the stored minimum distances to provide the at least one dissimilarity value.

11. A method of selecting a cohort model according to claim 7, wherein the vector represents a frequency response of a time sample of the utterance.

12. A method of selecting a cohort model according to claim 7, wherein the vector is quantised.

13. A method of selecting a cohort model according to claim 1, wherein each speaker model and cohort model comprises a set of parameters, each parameter representing a characteristic of the speech of the speaker, and the step of determining at least one similarity value between each of a plurality of the existing speaker models and the target speaker model includes the step of, for each existing speaker model for which a similarity value is to be determined:

comparing the value of at least one of the parameters of the existing speaker model with the value of at least one corresponding parameter of the target speaker model to determine the similarity value.

14. An apparatus for selecting at least one cohort model for use in a speaker verification system, the apparatus comprising:

a database of existing speaker models;

a receiver for receiving target speaker voice utterances from a target speaker;

a speech digitizer coupled to the receiver to provide at least one speech sample;

a modeller coupled to the speech digitizer for producing and storing a target speaker model from the at least one speech sample;

similarity determining means coupled to the database and the modeller for determining at least one similarity value between each of a plurality of the existing speaker models and the target speaker model;

storage means coupled to the similarity determining means for storing the similarity values;

selection means coupled to the storage means for comparing the similarity values and selecting at least one similar existing speaker model as a cohort model for the target speaker; and a memory coupled to the selection means for storing the cohort model.

15. An apparatus for selecting a cohort model according to claim 14, further comprising:

dissimilarity determining means coupled to the database and the memory for determining at least one dissimilarity value between at least some of the plurality of the existing speaker models and each cohort model previously selected; wherein the selection means is coupled to the dissimilarity determining means for selecting at least one of the existing speaker models which is similar to the target speaker model and dissimilar to the at least one cohort model previously selected as at least another one cohort model for the target speaker.

16. An apparatus for selecting a cohort model according to claim 14, wherein each speaker model and cohort model comprises a set of parameters, each parameter representing a characteristic of the speech of the speaker, and the similarity determining means comprises:

a comparator circuit for comparing the value of at least one of the parameters of the existing speaker model with the value of at least one corresponding parameter of the target speaker model to determine the similarity value.

17. An apparatus for selecting a cohort model according to claim 16, wherein the dissimilarity determining means comprises:

a comparator circuit for comparing the value of at least one of the parameters of the existing speaker model with the value of at least one corresponding parameter of the cohort model to determine the dissimilarity value.

18. An apparatus for selecting a cohort model according to claim 17, wherein the selection means comprises combining means for combining in a predetermined combination the dissimilarity values of two or more previously selected cohort models and the selection means selects at least one of the existing speaker models which has a high similarity value and a high combined dissimilarity value.

19. An apparatus for selecting a cohort model according to claim 18, wherein the combining means includes a normaliser for normalising the predetermined combination to the similarity values.

20. An apparatus for selecting a cohort model according to claim 17, wherein the comparator circuit comprises:

means for storing at least two vectors representing at least two of the parameters in n-dimensional space for each existing speaker model and each previously selected cohort model;

means for determining the distance in the n-dimensional space, for each existing speaker model vector, between that existing speaker model vector and each cohort model vector;

means for storing, for each existing speaker model vector, whichever distance to a cohort model vector has a minimum value; and means for summing the stored minimum distances to provide the at least one dissimilarity value.

21. An apparatus for selecting a cohort model according to claim 16, wherein the comparator circuit comprises:

means for storing at least two vectors representing at least two of the parameters in n-dimensional space for each existing speaker model and the target speaker model;

means for determining the distance in the n-dimensional space, for each existing speaker model vector, between that existing speaker model vector and each target speaker model vector;

means for storing, for each existing speaker model vector, whichever distance to a target speaker model vector has a minimum value; and means for summing the stored minimum distances to provide the at least one similarity value.

22. An apparatus comprising:

a speaker model database;

a target speaker voice utterance receiver having an output;

a speech digitizer having a speech sample output and an input coupled to the output of the target speaker voice utterance receiver;

a modeller having an input coupled to the speech sample output, a first memory containing a target speaker model that corresponds to the speech sample output, and an output;

a similarity determiner being operably coupled to the speaker model database and to the output of the modeller, and having an output that provides at least one similarity value between each of a plurality of existing speaker models and the target speaker model;

a second memory operably coupled to the similarity determiner and having the at least one similarity value stored therein;

a selector operably coupled to the second memory and having an output that provides a selected speaker model;

a third memory operably coupled to the output of the selector and having the selected speaker model stored therein as a cohort model.

23. An apparatus according to claim 22, wherein the modeller comprises means for modelling the target speaker model from target speaker voice utterances received from by the target speaker voice utterance receiver and digitised by the speech digitizer.

24. An apparatus according to claim 22, wherein the selector comprises selection means for comparing the stored similarity values and selecting an existing speaker model that has a high similarity value as the cohort model.

25. An apparatus according to claim 22, further comprising a dissimilarity determiner operably coupled to the speaker model database and to the output of the modeller, and having an output that provides at least one dissimilarity value between each of the plurality of existing speaker models and each cohort model previously selected and a second memory operably coupled to the dissimilarity determiner and having the at least one dissimilarity value stored therein.

26. An apparatus according to claim 25, wherein the selector comprises selection means for comparing the stored similarity values and the stored dissimilarity values and selecting an existing speaker model that has a high similarity value and a high dissimilarity value as a cohort model.

* * * * *